United States Patent
Umezu et al.

(10) Patent No.: US 12,334,505 B2
(45) Date of Patent: Jun. 17, 2025

(54) SECONDARY BATTERY

(71) Applicant: MURATA MANUFACTURING CO., LTD., Kyoto (JP)

(72) Inventors: Satoshi Umezu, Kyoto (JP); Yusuke Morino, Kyoto (JP); Takumi Hiasa, Kyoto (JP); Kazunari Motohashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 590 days.

(21) Appl. No.: 17/728,482

(22) Filed: Apr. 25, 2022

(65) Prior Publication Data

US 2022/0255135 A1    Aug. 11, 2022

Related U.S. Application Data

(63) Continuation of application No. PCT/JP2020/039227, filed on Oct. 19, 2020.

(30) Foreign Application Priority Data

Oct. 25, 2019    (JP) .................. 2019-194119

(51) Int. Cl.
*H01M 10/0569*    (2010.01)
*H01M 10/0525*    (2010.01)

(52) U.S. Cl.
CPC ... *H01M 10/0569* (2013.01); *H01M 10/0525* (2013.01); *H01M 2300/0028* (2013.01)

(58) Field of Classification Search
CPC ......... H01M 10/0569; H01M 10/0525; H01M 2300/0028
See application file for complete search history.

(56) References Cited

U.S. PATENT DOCUMENTS

| | | | |
|---|---|---|---|
| 2004/0058251 A1* | 3/2004 | Hamamoto ....... | H01M 10/0567 429/200 |
| 2008/0241702 A1* | 10/2008 | Takahashi ......... | H01M 10/0568 429/332 |
| 2013/0224607 A1* | 8/2013 | Ihara .................. | H01M 10/0567 429/338 |
| 2014/0030609 A1 | 1/2014 | Abe et al. | |
| 2018/0183105 A1* | 6/2018 | Asano ............... | H01M 10/0525 |
| 2021/0043937 A1 | 2/2021 | Hashimoto | |

FOREIGN PATENT DOCUMENTS

| | | |
|---|---|---|
| CN | 101090165 | 12/2007 |
| CN | 102694161 | 9/2012 |
| CN | 103907237 | 7/2014 |
| CN | 103928709 | 7/2014 |

(Continued)

OTHER PUBLICATIONS

Chinese Office Action issued Nov. 23, 2023 in corresponding Chinese Application No. 202080075270.2.

*Primary Examiner* — Nicholas A Smith
*Assistant Examiner* — Seamus Patrick McNulty
(74) *Attorney, Agent, or Firm* — K&L Gates LLP

(57) ABSTRACT

A secondary battery includes a positive electrode, a negative electrode, and an electrolytic solution. A potential of the positive electrode, versus a lithium reference electrode, at a time of charging is higher than or equal to 4.50 V. The electrolytic solution includes a branched carboxylic acid ester compound.

9 Claims, 5 Drawing Sheets

(56) References Cited

FOREIGN PATENT DOCUMENTS

| | | |
|---|---|---|
| JP | 2008098053 | 4/2008 |
| JP | 2008-06-19 | 6/2008 |
| JP | 2008140760 A | 6/2008 |
| JP | 2008243642 | 10/2008 |
| JP | 2008243642 A | 10/2008 |
| JP | 2009038018 | 2/2009 |
| JP | 2012054156 A | 3/2012 |
| WO | 2012141001 A1 | 10/2012 |
| WO | 2019208791 A1 | 10/2019 |

* cited by examiner

SECONDARY BATTERY

CROSS REFERENCE TO RELATED APPLICATIONS

The present application is a continuation of PCT patent application no. PCT/JP2020/039227, filed on Oct. 19, 2020, which claims priority to Japanese patent application no. JP2019-194119, filed on Oct. 25, 2019, the entire contents of which are being incorporated herein by reference.

BACKGROUND

The present technology relates to a secondary battery that includes a positive electrode, a negative electrode, and an electrolytic solution.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery influences a battery characteristic and has therefore been considered in various ways.

For example, in order to improve a cyclability characteristic, an electrolytic solution includes a specific ester having two alkyl groups at the α-position carbon of the carbonyl group. Further, for example, in order to improve a load characteristic, an electrolytic solution includes a chain carboxylic acid ester such as an isobutyric acid methyl ester, and a positive electrode potential, versus metallic lithium, in a fully charged state is set to be lower than 4.50 V.

SUMMARY

The present application relates to a secondary battery that includes a positive electrode, a negative electrode, and an electrolytic solution.

Although consideration has been given in various ways to improve a battery characteristic of a secondary battery, the battery characteristic is not sufficient yet. Accordingly, there is still room for improvement in terms thereof.

The present technology has been made in view of such an issue and is directed to providing a secondary battery that makes it possible to achieve a superior battery characteristic according to an embodiment.

A secondary battery according to an embodiment of the present technology includes a positive electrode, a negative electrode, and an electrolytic solution. A potential of the positive electrode, versus a lithium reference electrode, at a time of charging is higher than or equal to 4.50 V. The electrolytic solution includes a branched carboxylic acid ester compound represented by Formula (1).

[Chem. 1]
Chem. 1

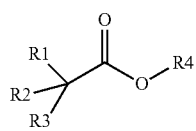

(1)

where:
each of R1, R2, and R3 is one of a hydrogen group, a halogen group, an alkyl group, or a halogenated alkyl group;
R4 is one of an alkyl group or a halogenated alkyl group;
two or more of R1, R2, or R3 are each one of an alkyl group or a halogenated alkyl group; and
a total of carbon number of R1, carbon number of R2, and carbon number of R3 is 2 or 3.

Here, the term "halogenated alkyl group" is a group obtained by substituting each of one or more hydrogen groups of an alkyl group with a halogen group. The halogen group is not particularly limited in kind. Accordingly, only one halogen group may be used, or two or more halogen groups may be used.

According to an embodiment, the potential of the positive electrode, versus a lithium reference electrode, at the time of charging is higher than or equal to 4.50 V, and the electrolytic solution includes the branched carboxylic acid ester compound. Accordingly, it is possible to achieve a superior battery characteristic.

Note that effects of the present technology are not necessarily limited to those described above and may include any suitable effects including described below in relation to the present technology.

DETAILED DESCRIPTION

One or more embodiments of the present technology are described below in detail with reference to the drawings.

A description is given first of a secondary battery according to an embodiment of the present technology. The secondary battery to be described here is a secondary battery that obtains a battery capacity using insertion and extraction of an electrode reactant, and includes a positive electrode, a negative electrode, and an electrolytic solution.

In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is a light metal such as an alkali metal or an alkaline earth metal. Examples of the alkali metal include lithium, sodium, and potassium. Examples of the alkaline earth metal include beryllium, magnesium, and calcium. Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
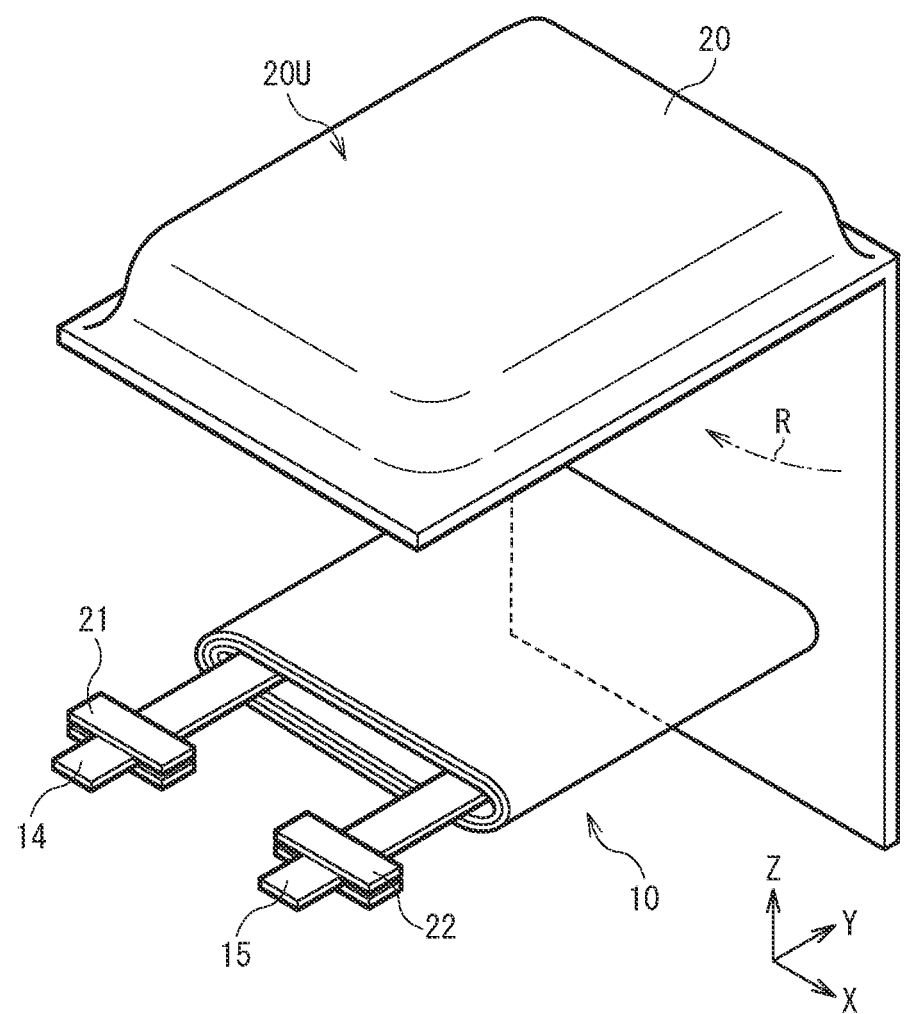
FIG. 1 is a perspective view of a configuration of a secondary battery of a laminated-film type according to one embodiment of the technology.
Figure 2:
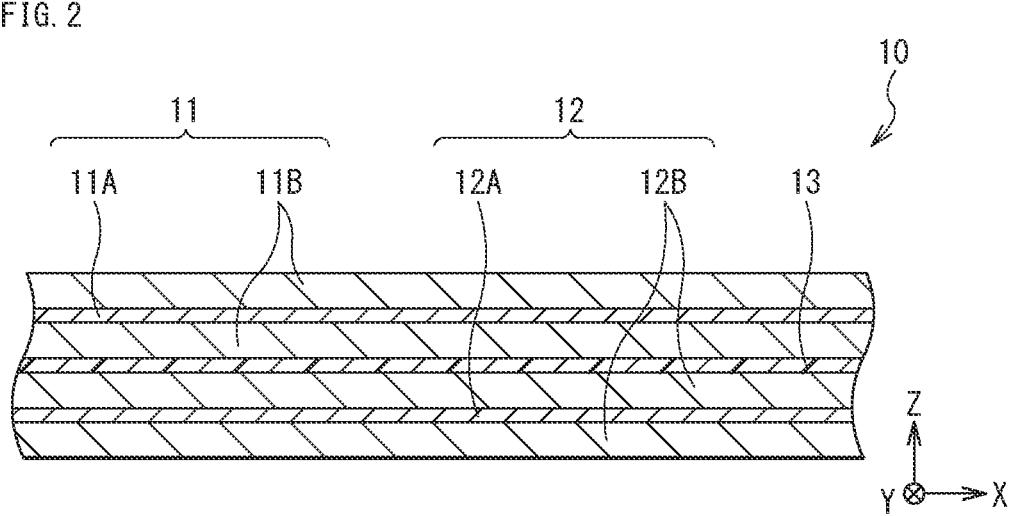
FIG. 2 is a sectional view of a configuration of a wound electrode body illustrated in FIG. 1.

FIG. 1 illustrates a perspective configuration of the secondary battery. FIG. 2 illustrates a sectional configuration of a wound electrode body 10 illustrated in FIG. 1. Note that FIG. 1 illustrates a state in which the wound electrode body 10 and a film 20 are separated away from each other, and FIG. 2 illustrates only a portion of the wound electrode body 10.

The secondary battery described here is a secondary battery of a laminated-film type. In the secondary battery, as illustrated in FIG. 1, a battery device of a wound type, i.e., the wound electrode body 10, is contained inside the film 20 having a pouch shape. To the wound electrode body 10, a positive electrode lead 14 and a negative electrode lead 15 are coupled.

The film 20 is an outer package member to contain the wound electrode body 10. The film 20 has softness or flexibility. The film 20 is a single film that is foldable in a direction of an arrow R (an arrowed dash-dotted line) illustrated in FIG. 1. The film 20 has a depression part 20U to place the wound electrode body 10 therein. The depression part 20U is a so-called deep drawn part.

Specifically, the film 20 is a three-layered laminated film including a fusion-bonding layer, a metal layer, and a surface protective layer that are stacked in this order from an inner side. In a state in which the film 20 is folded, outer edges of the fusion-bonding layer are fusion-bonded to each other. The fusion-bonding layer includes a polymer compound such as polypropylene. The metal layer includes a metal material such as aluminum. The surface protective layer includes a polymer compound such as nylon. The number of layers of the film 20 as a laminated film is not limited to three, and may be one, two, or four or more.

A sealing film 21 is interposed between the film 20 and the positive electrode lead 14. A sealing film 22 is interposed between the film 20 and the negative electrode lead 15. Each of the sealing films 21 and 22 is a member that prevents entry of outside air, and includes one or more of materials having adherence to the positive electrode lead 14 and the negative electrode lead 15, such as a polyolefin resin. Examples of the polyolefin resin include polyethylene, polypropylene, modified polyethylene, and modified polypropylene. Note that one or both of the sealing films 21 and 22 may be omitted.

As illustrated in FIGS. 1 and 2, the wound electrode body 10 includes a positive electrode 11, a negative electrode 12, a separator 13, and an electrolytic solution. The electrolytic solution is a liquid electrolyte. The wound electrode body 10 has a structure in which the positive electrode 11 and the negative electrode 12 are stacked on each other with the separator 13 interposed therebetween, and the stack of the positive electrode 11, the negative electrode 12, and the separator 13 is wound. The positive electrode 11, the negative electrode 12, and the separator 13 are each impregnated with the electrolytic solution. The positive electrode 11, the negative electrode 12, and the electrolytic solution are placed inside the outer package member (the film 20) having softness, as described above.

As illustrated in FIG. 2, the positive electrode 11 includes a positive electrode current collector 11A, and two positive electrode active material layers 11B provided on respective opposite sides of the positive electrode current collector 11A. However, the positive electrode active material layer 11B may be provided only on one of the opposite sides of the positive electrode current collector 11A.

The positive electrode current collector 11A includes one or more of electrically conductive materials including, without limitation, aluminum, nickel, and stainless steel. The positive electrode active material layer 11B includes one or more of positive electrode active materials into which lithium is insertable and from which lithium is extractable. The positive electrode active material layer 11B may further include, without limitation, a positive electrode binder and a positive electrode conductor.

Although not particularly limited in kind, the positive electrode active material is a lithium-containing compound such as a lithium-containing transition metal compound. The lithium-containing transition metal compound includes lithium and one or more of transition metal elements, and may further include one or more of other elements. The other elements may be any elements other than transition metal elements, and are not particularly limited in kind. In particular, the other elements are preferably those belong to groups 2 to 15 in the long period periodic table of elements. Note that the lithium-containing transition metal compound may be an oxide or may be any other compound such as a phosphoric acid compound, a silicic acid compound, or a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.102}$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The positive electrode conductor may be a material such as a metal material or an electrically conductive polymer as long as the material has an electrically conductive property.

Upon charging, the secondary battery is chargeable until a battery voltage becomes sufficiently high. Specifically, the secondary battery is chargeable until a potential of the positive electrode 11, versus a lithium reference electrode, at the time of charging becomes higher than or equal to 4.50 V.

As illustrated in FIG. 2, the negative electrode 12 includes a negative electrode current collector 12A, and two negative electrode active material layers 12B provided on respective opposite sides of the negative electrode current collector 12A. However, the negative electrode active material layer 12B may be provided only on one of the opposite sides of the negative electrode current collector 12A.

The negative electrode current collector 12A includes one or more of electrically conductive materials including, without limitation, copper, aluminum, nickel, and stainless steel. The negative electrode active material layer 12B includes one or more of negative electrode active materials into which lithium is insertable and from which lithium is extractable. The negative electrode active material layer 12B may further include, without limitation, a negative electrode binder and a negative electrode conductor.

The negative electrode active material is not particularly limited in kind, and examples thereof include a carbon material and a metal-based material. Examples of the carbon material include graphitizable carbon, non-graphitizable carbon, and graphite. The metal-based material is metal elements and metalloid elements that are each able to form an alloy with lithium. More specifically, the metal-based material includes one or more of elements including, without limitation, silicon and tin. The metal-based material may be, for example, a simple substance, an alloy, a compound, or a mixture of two or more thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$ or $0.2<v<1.4$), $LiSiO$, $SnO_w$ ($0<w\leq2$), $SnSiO_3$, $LiSnO$, and $Mg_2Sn$.

Details of the negative electrode binder are similar to the details of the positive electrode binder described above, and details of the negative electrode conductor are similar to the details of the positive electrode conductor described above.

A method of forming the negative electrode active material layer 12B is not particularly limited, and includes one or more of methods including, without limitation, a coating method, a vapor-phase method, a liquid-phase method, a thermal spraying method, and a firing (sintering) method.

As illustrated in FIG. 2, the separator 13 is interposed between the positive electrode 11 and the negative electrode 12. The separator 13 is an insulating porous film that allows lithium to pass therethrough while preventing a short-circuit due to contact between the positive electrode 11 and the negative electrode 12. The separator 13 may be a single-layer film including one porous film, or may be a multi-layer film including one or more porous films that are stacked on each other. The porous film includes one or more of polymer compounds including, without limitation, polytetrafluoroethylene, polypropylene, and polyethylene.

The electrolytic solution includes a solvent and an electrolyte salt. The electrolytic solution may include only one solvent or may include two or more solvents. The electrolytic solution may include only one electrolyte salt or may include two or more electrolyte salts.

The solvent includes one or more of non-aqueous solvents (organic solvents). An electrolytic solution including a non-aqueous solvent is a so-called non-aqueous electrolytic solution.

Specifically, the solvent includes a branched carboxylic acid ester compound represented by Formula (1). The solvent may include only one branched carboxylic acid ester compound or may include two or more branched carboxylic acid ester compounds.

[Chem. 2]
Chem. 2

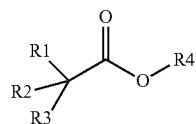

(1)

where:
each of R1, R2, and R3 is one of a hydrogen group, a halogen group, an alkyl group, or a halogenated alkyl group;
R4 is one of an alkyl group or a halogenated alkyl group;
two or more of R1, R2, or R3 are each one of an alkyl group or a halogenated alkyl group; and
a total of carbon number of R1, carbon number of R2, and carbon number of R3 is 2 or 3.

As is apparent from Formula (1), the branched carboxylic acid ester compound is a chain compound in which a carbon chain moiety (R1-C(—R2)(-R3)-) other than a carboxylic acid ester moiety (—C(=O)—O—R4) has a branched structure.

A reason why the electrolytic solution includes the branched carboxylic acid ester compound is that a decomposition reaction of the electrolytic solution is suppressed even if, upon charging, the secondary battery is charged until the potential of the positive electrode 11 versus a lithium reference electrode becomes higher than or equal to 4.50 V, that is, until the battery voltage becomes a high charge voltage, as described above. As a result, reduction in a discharge capacity is suppressed even if charging and discharging are repeated under a high charge voltage condition.

In a case where the electrolytic solution includes a branched carboxylic acid compound, generation of gas due to the decomposition reaction of the electrolytic solution is suppressed inside the pouch-shaped film 20. This helps to reduce swelling of the secondary battery even if the film 20 having softness is used. In other words, even if the wound electrode body 10 including the positive electrode 11, the negative electrode 12, and the electrolytic solution is placed inside the film 20 having softness which is easily deformed, the swelling of the secondary battery is sufficiently suppressed.

Each of R1, R2, and R3 is not particularly limited as long as each of R1, R2, and R3 is one of a hydrogen group, a halogen group, an alkyl group, or a halogenated alkyl group, as described above. Note that two or more of R1, R2, or R3 may be bonded to each other to form a ring.

The halogen group is one of groups including, without limitation, a fluorine group, a chlorine group, a bromine group, and an iodine group. The alkyl group is one of groups including, without limitation, a methyl group and an ethyl group. The halogenated alkyl group is, as described above, a group obtained by substituting each of one or more of hydrogen groups of an alkyl group with a halogen group. The halogenated alkyl group may include, as described above, only one halogen group, or two or more halogen groups. Specific examples of the halogenated alkyl group include a monofluoromethyl group, a difluoromethyl group, a trifluoromethyl group, a monofluoroethyl group, a difluoroethyl group, a trifluoroethyl group, a tetrafluoroethyl group, and a pentafluoroethyl group.

Note that two or more of R1, R2, or R3 are each one of an alkyl group or a halogenated alkyl group, as described above. Thus, any two of R1, R2, and R3 are each one of an alkyl group or a halogenated alkyl group, and the remaining one is one of a hydrogen group, a halogen group, an alkyl group, or a halogenated alkyl group. Alternatively, all of R1, R2, and R3 are each one of an alkyl group or a halogenated alkyl group.

Further, the total of the carbon number of R1, the carbon number of R2, and the carbon number of R3 is 2 or 3. In a case where each of R1, R2, and R3 is one of an alkyl group or a halogenated alkyl group, the carbon number is the number of carbon atoms included in each of the alkyl group and the halogenated alkyl group. Further, in a case where each of R1, R2, and R3 is one of a hydrogen group or a halogen group, the carbon number is 0.

The respective kinds of R1, R2 and R3 are thereby substantially limited. Specifically, there are two cases, i.e., a first case and a second case, regarding the respective kinds of R1, R2, and R3, as described below.

In the first case, each of R1 and R2 is one of a methyl group having carbon number of 1 or a halogenated methyl group having carbon number of 1, and R3 is one of a hydrogen group, a halogen group, a methyl group, or a halogenated methyl group.

In the second case, R1 is one of a methyl group having carbon number of 1 or a halogenated methyl group having carbon number of 1, R2 is one of an ethyl group having carbon number of 2 or a halogenated ethyl group having carbon number of 2, and R3 is one of a hydrogen group or a halogen group. In this case, it goes without saying that R2 may be one of a methyl group having carbon number of 1 or a halogenated methyl group having carbon number of 1, and R1 may be one of an ethyl group having carbon number of 2 or a halogenated ethyl group having carbon number of 2.

A reason why the total of the carbon number of R1, the carbon number of R2, and the carbon number of R3 is 2 or 3 is that the total is not too large, and this secures solubility and compatibility of the branched carboxylic acid ester compound.

In particular, each of R1 and R2 is preferably one of the alkyl group or the halogenated alkyl group, and R3 is preferably one of the hydrogen group or the halogen group. In other words, the respective kinds of R1 to R3 are preferably defined as in the second case described above. A reason for this is that the decomposition reaction of the electrolytic solution is sufficiently suppressed while securing the solubility and the compatibility of the branched carboxylic acid ester compound.

In this case, it is more preferable that each of R1 and R2 is the alkyl group and R3 is the hydrogen group. A reason for this is that the decomposition reaction of the electrolytic solution is further suppressed while securing the solubility and the compatibility of the branched carboxylic acid ester compound.

As described above, R4 is not particularly limited as long as R4 is one of an alkyl group or a halogenated alkyl group. Details of each of the alkyl group and the halogenated alkyl group are as described above.

Although not particularly limited, carbon number of R4 is preferably within a range from 1 to 5 both inclusive, in particular. A reason for this is that the solubility and the compatibility of the branched carboxylic acid ester compound are secured.

Specific examples of the branched carboxylic acid ester compound include respective compounds represented by Formulae (1-1) to (1-11). Note that the branched carboxylic acid ester compound is not limited to the respective compounds represented by Formulae (1-1) to (1-11) as long as the branched carboxylic acid ester compound is a compound that corresponds to a general formula represented by Formula (1).

[Chem. 3]

Chem. 3

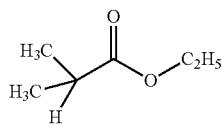
(1-1)

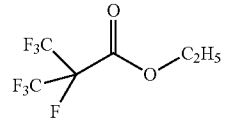
(1-2)

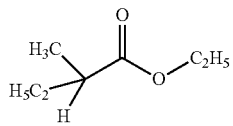
(1-3)

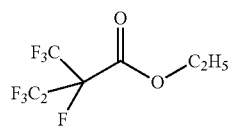
(1-4)

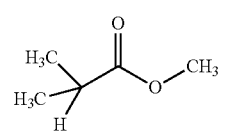
(1-5)

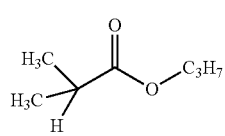
(1-6)

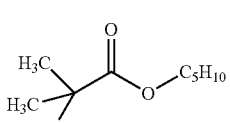
(1-7)

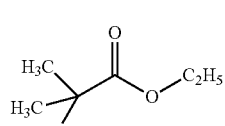
(1-8)

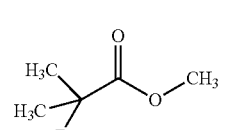
(1-9)

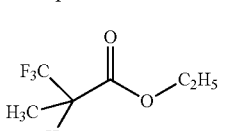
(1-10)

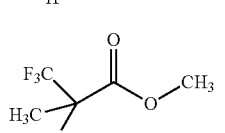
(1-11)

Although not particularly limited, a content of the branched carboxylic acid ester compound in the solvent is preferably within a range from 50 wt % to 80 wt % both inclusive, in particular. A reason for this is that the decomposition reaction of the electrolytic solution is sufficiently suppressed.

Note that the solvent may include another compound together with the above-described branched carboxylic acid ester compound. The other compound includes one or more of non-aqueous solvents (excluding the branched carboxylic acid ester compound).

Examples of the other compound include esters and ethers. More specific examples of the other compound include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Examples of the cyclic carbonic acid ester include ethylene carbonate and propylene carbonate.

Examples of the chain carbonic acid ester include dimethyl carbonate, diethyl carbonate, and methyl ethyl carbonate. Examples of the carboxylic-acid-ester-based compound include ethyl acetate, ethyl propionate, propyl propionate, and ethyl trimethyl acetate. Examples of the lactone-based compound include γ-butyrolactone and γ-valerolactone. Examples of the ethers other than the lactone-based compounds described above include 1,2-dimethoxyethane, tetrahydrofuran, 1,3-dioxolane, and 1,4-dioxane.

In particular, the solvent preferably includes the cyclic carbonic acid ester together with the branched carboxylic acid ester compound. Inclusion of the cyclic carbonic acid ester having a high specific dielectric constant in the solvent improves a dissociation property of the electrolyte salt and mobility of lithium. Although not particularly limited, a content of the cyclic carbonic acid ester in the solvent is preferably within a range from 20 wt % to 50 wt % both inclusive, in particular. A reason for this is that the decomposition reaction of the electrolytic solution is sufficiently suppressed.

Further, examples of the other compound include an unsaturated cyclic carbonic acid ester, a halogenated carbonic acid ester, a sulfonic acid ester, a phosphoric acid ester, an acid anhydride, a nitrile compound, and an isocyanate compound. A reason for this is that chemical stability of the electrolytic solution improves.

Specific examples of the unsaturated cyclic carbonic acid ester include vinylene carbonate, vinylethylene carbonate, and methylene ethylene carbonate. Examples of the halogenated carbonic acid ester include fluoroethylene carbonate and difluoroethylene carbonate. Examples of the sulfonic acid ester include 1,3-propane sultone. Examples of the phosphoric acid ester include trimethyl phosphate. Examples of the acid anhydride include a cyclic carboxylic acid anhydride, a cyclic disulfonic acid anhydride, and a cyclic carboxylic acid sulfonic acid anhydride. Examples of the cyclic carboxylic acid anhydride include succinic anhydride, glutaric anhydride, and maleic anhydride. Examples of the cyclic disulfonic acid anhydride include ethane disulfonic anhydride and propane disulfonic anhydride. Examples of the cyclic carboxylic acid sulfonic acid anhydride include sulfobenzoic anhydride, sulfopropionic anhydride, and sulfobutyric anhydride. Examples of the nitrile compound include acetonitrile and succinonitrile. Examples of the isocyanate compound include hexamethylene diisocyanate.

In particular, the electrolytic solution preferably includes the cyclic disulfonic acid anhydride together with the branched carboxylic acid ester compound. A reason for this is that the chemical stability of the electrolytic solution sufficiently improves, thus sufficiently suppressing decomposition of the electrolytic solution. Although not particularly limited, a content of the cyclic disulfonic acid anhydride in the electrolytic solution is preferably within a range from 0.01 wt % to 1 wt % both inclusive, in particular. A reason for this is that the decomposition reaction of the electrolytic solution is further suppressed.

The electrolyte salt includes one or more of light metal salts including, without limitation, a lithium salt. Examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethanesulfonyl)imide ($LiN(CF_3SO_2)_2$), lithium tris(trifluoromethanesulfonyl)methide ($LiC(CF_3SO_2)_3$), and lithium bis(oxalato)borate ($LiB(C_2O_4)_2$). Although not particularly limited, a content of the electrolyte salt is within a range from 0.3 mol/kg to 3.0 mol/kg both inclusive with respect to the solvent. A reason for this is that high ion conductivity is obtainable.

The positive electrode lead 14 is coupled to the positive electrode 11 (the positive electrode current collector 11A), and the negative electrode lead 15 is coupled to the negative electrode 12 (the negative electrode current collector 12A). The positive electrode lead 14 includes one or more of electrically conductive materials including, without limitation, aluminum, and the negative electrode lead 15 includes one or more of electrically conductive materials including, without limitation, copper, nickel, and stainless steel. The positive electrode lead 14 and the negative electrode lead 15 are led out in respective directions that are similar to each other, from inside to outside the film 20. The positive electrode lead 14 and the negative electrode lead 15 each have a shape such as a thin plate shape or a meshed shape.

The secondary battery operates as described below.

Upon charging, lithium is extracted from the positive electrode 11, and the extracted lithium is inserted into the negative electrode 12 via the electrolytic solution. In this case, the secondary battery is charged until the potential of the positive electrode 11 versus a lithium reference electrode becomes higher than or equal to 4.50 V, as described above. Thus, the secondary battery is charged until the battery voltage becomes the high charge voltage.

Upon discharging, lithium is extracted from the negative electrode 12, and the extracted lithium is inserted into the positive electrode 11 via the electrolytic solution.

In a case of manufacturing the secondary battery, the positive electrode 11 and the negative electrode 12 are each fabricated and the electrolytic solution is prepared, following which the secondary battery is assembled, according to a procedure to be described below.

First, the positive electrode active material is mixed with materials including, without limitation, the positive electrode binder and the positive electrode conductor on an as-needed basis to thereby obtain a positive electrode mixture. Thereafter, the positive electrode mixture is put into a solvent such as an organic solvent to thereby prepare a paste positive electrode mixture slurry. Lastly, the positive electrode mixture slurry is applied on opposite sides of the positive electrode current collector 11A to thereby form the positive electrode active material layers 11B. Thereafter, the positive electrode active material layers 11B may be compression-molded by means of a machine such as a roll pressing machine. In this case, the positive electrode active material layers 11B may be heated. The positive electrode active material layers 11B may be compression-molded multiple times. In this manner, the positive electrode active material layers 11B are formed on the respective opposite sides of the positive electrode current collector 11A. Thus, the positive electrode 11 is fabricated.

The negative electrode active material layers 12B are formed on respective opposite sides of the negative electrode current collector 12A by a procedure similar to the fabrication procedure of the positive electrode 11 described above. Specifically, the negative electrode active material is mixed with materials including, without limitation, the negative electrode binder and the negative electrode conductor on an as-needed basis to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on the opposite sides of the negative electrode current collector 12A to thereby form the negative electrode active material layers 12B. Thereafter, the negative electrode active material layers 12B may be compression-molded. In this manner, the negative electrode active material layers 12B are formed on the respective opposite sides of the negative electrode current collector 12A. Thus, the negative electrode 12 is fabricated.

The electrolyte salt is added to a solvent including the branched carboxylic acid ester compound. The electrolyte salt is thereby dispersed or dissolved in the solvent. In this manner, the electrolytic solution is prepared.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method. Thereafter, the positive electrode 11 and the negative electrode 12 are stacked on each other with the separator 13 interposed therebetween, following which the stack of the positive electrode 11, the negative electrode 12, and the separator 13 is wound to thereby form a wound body. Thereafter, the wound body is placed inside the depression part 20U and the film 20 is folded in such a manner as to sandwich the wound body, following which outer edges of two sides of the film 20 (the fusion-bonding layer) are bonded to each other by a method such as a thermal fusion bonding method. The wound body is thereby contained in the pouch-shaped film 20.

Lastly, the electrolytic solution is injected into the pouch-shaped film 20, following which the outer edges of the remaining one side of the film 20 (the fusion-bonding layer) are bonded to each other by a method such as a thermal fusion bonding method to thereby seal the film 20. In this case, the sealing film 21 is interposed between the film 20 and the positive electrode lead 14, and the sealing film 22 is interposed between the film 20 and the negative electrode lead 15. The wound body is thereby impregnated with the electrolytic solution. Thus, the wound electrode body 10 is formed. In this manner, the wound electrode body 10 is sealed in the pouch-shaped film 20. As a result, the secondary battery of the laminated-film type is completed.

According to the secondary battery of the laminated-film type, the potential of the positive electrode 11, versus a lithium reference electrode, at the time of charging is higher than or equal to 4.50 V, and the electrolytic solution includes the branched carboxylic acid ester compound.

In this case, the decomposition reaction of the electrolytic solution is suppressed even if, upon charging, the secondary battery is charged until the battery voltage becomes the high charge voltage, as described above. As a result, the reduction in the discharge capacity is suppressed even if charging and discharging are repeated under the high charge voltage condition as compared with a case where the electrolytic solution does not include the branched carboxylic acid ester compound and a case where the electrolytic solution includes a compound other than the branched carboxylic acid ester compound. The "compound other than the branched carboxylic acid ester compound" is a compound similar to the branched carboxylic acid ester compound, and specific examples thereof include the carboxylic-acid-ester-based compound such as propyl propionate, and the carbonic-acid-ester-based compound (the chain carbonic acid ester) such as diethyl carbonate. Accordingly, it is possible to achieve a superior battery characteristic.

In particular, in Formula (1) representing the branched carboxylic acid ester compound, each of R1 and R2 may be a group such as the alkyl group, and R3 may be a group such as the hydrogen group. This sufficiently suppresses the decomposition reaction of the electrolytic solution while securing the solubility and the compatibility of the branched carboxylic acid ester compound, which makes it possible to achieve higher effects. In this case, each of R1 and R2 may be the alkyl group and R3 may be the hydrogen group. This further suppresses the decomposition reaction of the electrolytic solution, which makes it possible to achieve further higher effects.

Further, carbon number of R4 in Formula (1) may be within a range from 1 to 5 both inclusive. This secures the solubility and the compatibility of the branched carboxylic acid ester compound, which makes it possible to achieve higher effects.

Further, the content of the branched carboxylic acid ester compound in the solvent may be within a range from 50 wt % to 80 wt % both inclusive. This sufficiently suppresses the decomposition reaction of the electrolytic solution, which makes it possible to achieve higher effects.

Further, the solvent may further include the cyclic carbonic acid ester, and the content of the cyclic carbonic acid ester in the solvent may be within a range from 20 wt % to 50 wt % both inclusive. This improves the dissociation property of the electrolyte salt and the mobility of lithium while sufficiently suppressing the decomposition reaction of the electrolytic solution. Accordingly, it is possible to achieve higher effects.

Further, the electrolytic solution may further include the cyclic disulfonic acid anhydride, and the content of the cyclic disulfonic acid anhydride in the electrolytic solution may be within a range from 0.01 wt % to 1 wt % both inclusive. This further suppresses the decomposition reaction of the electrolytic solution, which makes it possible to achieve higher effects.

Further, the secondary battery may include a lithium-ion secondary battery. This allows a sufficient battery capacity to be obtained stably by utilizing lithium insertion and extraction, which makes it possible to achieve higher effects.

Next, a description is given of modifications of the above-described secondary battery according to an embodiment. The configuration of the secondary battery is appropriately modifiable as described below. Note that any two or more of the following series of modifications may be combined.

In FIGS. 1 and 2, the battery device of the wound type, i.e., the wound electrode body 10, is used. However, as illustrated in FIGS. 3 and 4 respectively corresponding to FIGS. 1 and 2, a battery device of a stacked type, i.e., a stacked electrode body 50, may be used instead of the wound electrode body 10.

Figure 3:
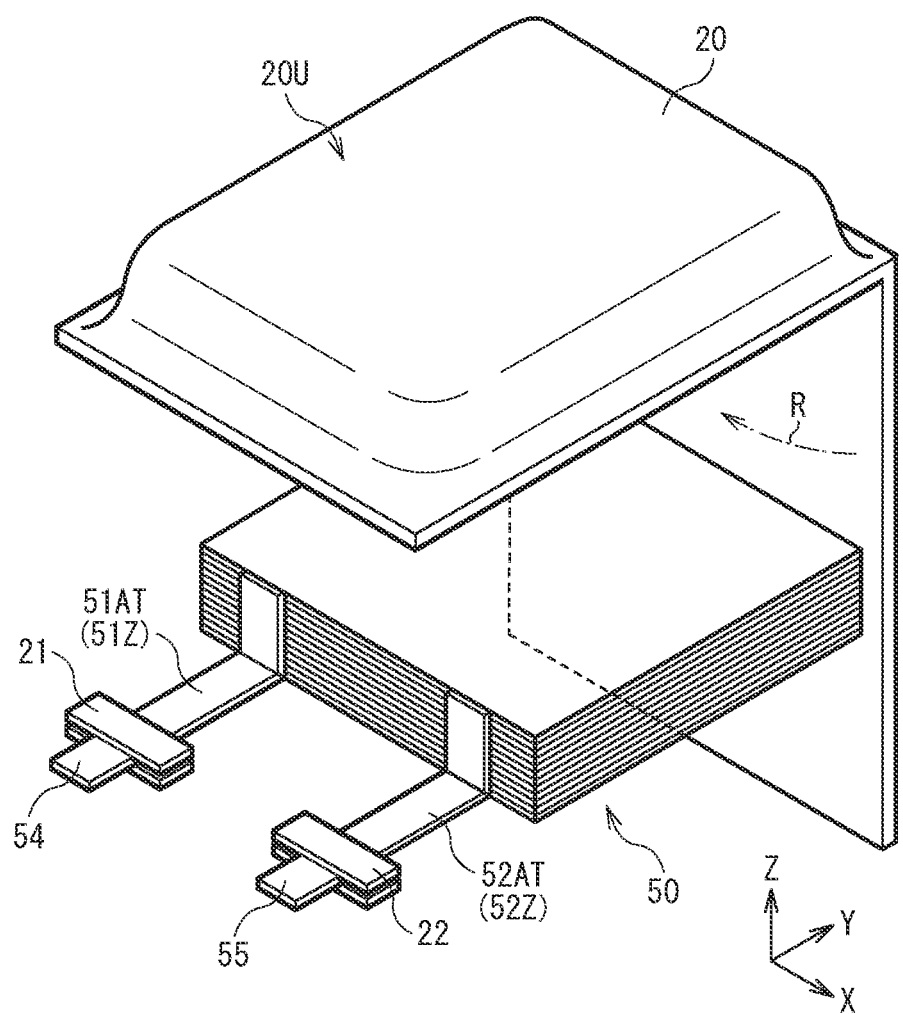
FIG. 3 is a perspective view of a configuration of a secondary battery according to Modification 1.
Figure 4:
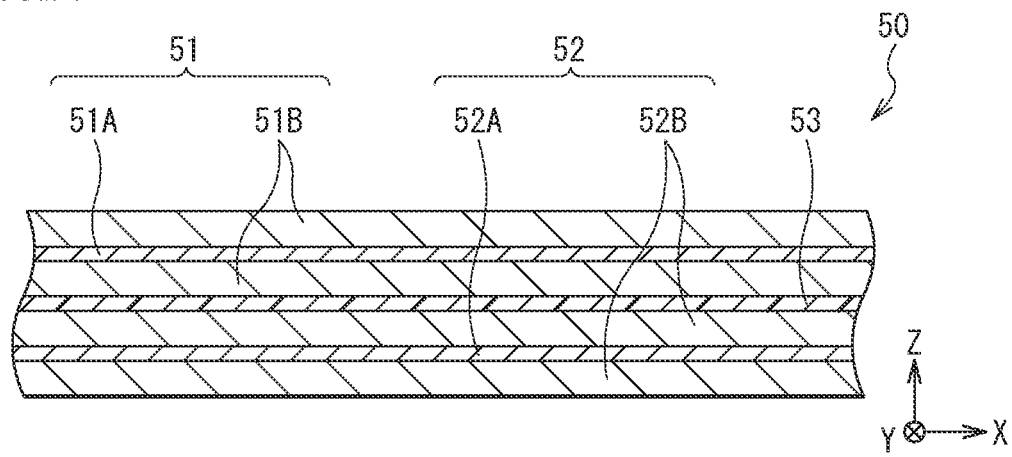
FIG. 4 is a sectional view of a configuration of a stacked electrode body illustrated in FIG. 3.

A secondary battery of a laminated-film type illustrated in FIGS. 3 and 4 has a configuration similar to that of the secondary battery of the laminated-film type illustrated in FIGS. 1 and 2, except that the secondary battery of the laminated-film type illustrated in FIGS. 3 and 4 includes the stacked electrode body 50 (a positive electrode 51, a negative electrode 52, and a separator 53), a positive electrode lead 54, and a negative electrode lead 55, instead of the wound electrode body 10 (the positive electrode 11, the negative electrode 12, and the separator 13), the positive electrode lead 14, and the negative electrode lead 15.

Respective configurations of the positive electrode 51, the negative electrode 52, the separator 53, the positive electrode lead 54, and the negative electrode lead 55 are similar to the respective configurations of the positive electrode 11, the negative electrode 12, the separator 13, the positive electrode lead 14, and the negative electrode lead 15, except for those described below.

In the stacked electrode body 50, the positive electrode 51 and the negative electrode 52 are alternately stacked on each other with the separator 53 interposed therebetween. Although the respective numbers of the positive electrode 51, the negative electrode 52, and the separator 53 to be stacked are not particularly limited, here, multiple positive electrodes 51 and multiple negative electrodes 52 are stacked on each other with multiple separators 53 interposed therebetween. The positive electrode 51, the negative electrode 52, and the separator 53 are each impregnated with the electrolytic solution. The positive electrode 51 includes a positive electrode current collector 51A and positive electrode active material layers 51B, and the negative electrode 52 includes a negative electrode current collector 52A and negative electrode active material layers 52B.

Note that, as illustrated in FIGS. 3 and 4, the positive electrode current collector 51A includes a projecting part 51AT in which no positive electrode active material layer 51B is provided. The negative electrode current collector 52A includes a projecting part 52AT in which no negative electrode active material layer 52B is provided. The projecting part 52AT is disposed at a position which does not overlap with the projecting part 51AT. Multiple projecting parts 51AT are joined to each other to thereby form a single joint part 51Z having a lead shape. Multiple projecting parts 52AT are joined to each other to thereby form a single joint part 52Z having a lead shape. The positive electrode lead 54 is coupled to the joint part 51Z, and the negative electrode lead 55 is coupled to the joint part 52Z.

A method of manufacturing the secondary battery of the laminated-film type illustrated in FIGS. 3 and 4 is similar to the method of manufacturing the secondary battery of the laminated-film type illustrated in FIGS. 1 and 2, except that the stacked electrode body 50 (the positive electrode lead 54 and the negative electrode lead 55) is fabricated instead of the wound electrode body 10 (the positive electrode lead 14 and the negative electrode lead 15).

In a case of fabricating the stacked electrode body 50, first, the positive electrode 51 is fabricated in which the positive electrode active material layers 51B are provided on respective opposite sides of the positive electrode current collector 51A (excluding the projecting part 51AT) and the negative electrode 52 is fabricated in which the negative electrode active material layers 52B are provided on respective opposite sides of the negative electrode current collector 52A (excluding the projecting part 52AT). Thereafter, the multiple positive electrodes 51 and the multiple negative electrodes 52 are stacked on each other with the multiple separators 53 interposed therebetween, to thereby form a stacked body. Thereafter, the multiple projecting parts 51AT are joined to each other by a method such as a welding method to thereby form the joint part 51Z, and the multiple projecting parts 52AT are joined to each other by a method such as a welding method to thereby form the joint part 52Z. Thereafter, the positive electrode lead 54 is coupled to the joint part 51Z by a method such as a welding method, and the negative electrode lead 55 is coupled to the joint part 52Z by a method such as a welding method. Lastly, the electrolytic solution is injected into the pouch-shaped film 20 containing the stacked body, following which the film 20 is sealed. The stacked body is thereby impregnated with the electrolytic solution. The stacked electrode body 50 is thus fabricated.

In the case where the stacked electrode body 50 is used also, it is possible to achieve effects similar to those in the case where the wound electrode body 10 is used.

The secondary battery of the laminated-film type illustrated in FIGS. 3 and 4 is not particularly limited in the number of the positive electrode leads 54 and the number of the negative electrode leads 55. In other words, the number of the positive electrode leads 54 is not limited to one, and may be two or more, and the number of the negative electrode leads 55 is not limited to one, and may be two or more. Similar effects are also achievable in the case where the number of the positive electrode leads 54 and the number of the negative electrode leads 55 are changed.

The secondary battery of the laminated-film type illustrated in FIGS. 1 to 4 includes the separator 13 which is a porous film. However, a separator of a stacked type including a polymer compound layer may be used instead of the separator 13 which is the porous film.

Specifically, the separator of the stacked type includes a base layer which is the above-described porous film, and a polymer compound layer provided on one side or each of opposite sides of the base layer. A reason for this is that adherence of the separator of the stacked type to each of the positive electrode 11 and the negative electrode 12 improves to suppress the occurrence of positional deviation of the wound electrode body 10. This helps to prevent the secondary battery from easily swelling even if, for example, the decomposition reaction of the electrolytic solution occurs. The polymer compound layer includes a polymer compound such as polyvinylidene difluoride. A reason for this is that such a polymer compound has superior physical strength and is electrochemically stable.

Note that, in a case where two polymer compound layers are provided on respective opposite sides of the base layer, one or both of the two polymer compound layers may include one or more kinds of particles including, for example, inorganic particles and resin particles. A reason for this is that particles such as inorganic particles dissipate heat upon heat generation by the secondary battery, and this improves heat resistance and safety of the secondary battery. The inorganic particles are not particularly limited in kind, and examples thereof include particles of the following materials: aluminum oxide (alumina), aluminum nitride, boehmite, silicon oxide (silica), titanium oxide (titania), magnesium oxide (magnesia), and zirconium oxide (zirconia).

In a case of fabricating the separator of the stacked type, a precursor solution including, without limitation, the polymer compound, an organic solvent, and, on as-needed basis, the inorganic particles, is prepared, following which the precursor solution is applied on one side or each of opposite sides of the base layer.

In the case where the separator of the stacked type is used also, lithium is movable between the positive electrode 11 and the negative electrode 12. Accordingly, it is possible to achieve similar effects.

The secondary battery of the laminated-film type illustrated in FIGS. 1 and 2 includes the electrolytic solution which is a liquid electrolyte. However, an electrolyte layer which is a gel electrolyte may be used instead of the electrolytic solution.

In the wound electrode body 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes a polymer compound together with the electrolytic solution. The electrolytic solution is held by the polymer compound in the electrolyte layer. The configuration of the electrolytic solution is as described above. The polymer compound includes, for example, polyvinylidene difluoride. In a case of forming the electrolyte layer, a precursor solution including, without limitation, the electrolytic solution, the polymer compound, and an organic solvent is prepared, following which the precursor solution is applied on opposite sides of each of the positive electrode 11 and the negative electrode 12.

In the case where the electrolyte layer is used also, lithium is movable between the positive electrode 11 and the negative electrode 12 via the electrolyte layer. Accordingly, it is possible to achieve similar effects.

Next, a description is given of applications (application examples) of the above-described secondary battery according to an embodiment.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

Some application examples of the secondary battery will now be described in detail. The configurations of the application examples described below are merely examples, and are appropriately modifiable. The secondary battery to be used in the following application examples is not limited to a particular kind, and may therefore be of a laminated-film type or a cylindrical type.

Figure 5:
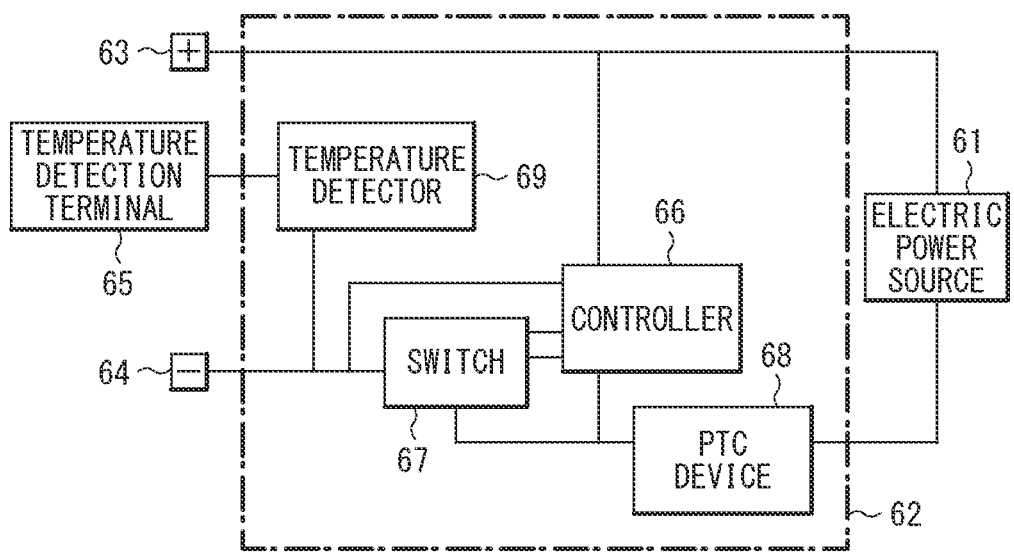
FIG. 5 is a block diagram illustrating a configuration of an application example of the secondary battery, which is a battery pack including a single battery.

FIG. 5 illustrates a block configuration of a battery pack including a single battery. The battery pack described here is a simple battery pack (a so-called soft pack) including one secondary battery, and is to be mounted on, for example, electronic equipment typified by a smartphone.

As illustrated in FIG. 5, the battery pack includes an electric power source 61 and a circuit board 62. The circuit board 62 is coupled to the electric power source 61, and includes a positive electrode terminal 63, a negative electrode terminal 64, and a temperature detection terminal (a so-called T terminal) 65.

The electric power source 61 includes one secondary battery. The secondary battery has a positive electrode lead coupled to the positive electrode terminal 63 and a negative electrode lead coupled to the negative electrode terminal 64. The electric power source 61 is couplable to outside via the positive electrode terminal 63 and the negative electrode terminal 64, and is thus chargeable and dischargeable via the positive electrode terminal 63 and the negative electrode terminal 64. The circuit board 62 includes a controller 66, a switch 67, a PTC device 68, and a temperature detector 69. However, the PTC device 68 may be omitted.

The controller 66 includes, for example, a central processing unit (CPU) and a memory, and controls an overall operation of the battery pack. The controller 66 detects and controls a use state of the electric power source 61 on an as-needed basis.

If a battery voltage of the electric power source 61 (the secondary battery) reaches an overcharge detection voltage or an overdischarge detection voltage, the controller 66 turns off the switch 67. This prevents a charging current from flowing into a current path of the electric power source 61. In addition, if a large current flows upon charging or discharging, the controller 66 turns off the switch 67 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 67 includes, for example, a charge control switch, a discharge control switch, a charging diode, and a discharging diode. The switch 67 performs switching between coupling and decoupling between the electric power source 61 and external equipment in accordance with an instruction from the controller 66. The switch 67 includes, for example, a metal-oxide-semiconductor field-effect transistor (MOSFET) including a metal-oxide semiconductor. The charging and discharging currents are detected on the basis of an ON-resistance of the switch 67.

The temperature detector 69 includes a temperature detection device such as a thermistor. The temperature detector 69 measures a temperature of the electric power source 61 using the temperature detection terminal 65, and outputs a result of the temperature measurement to the controller 66. The result of the temperature measurement to be obtained by the temperature detector 69 is used, for example, in a case where the controller 66 performs charge/discharge control upon abnormal heat generation or in a case where the controller 66 performs a correction process upon calculating a remaining capacity.

Figure 6:
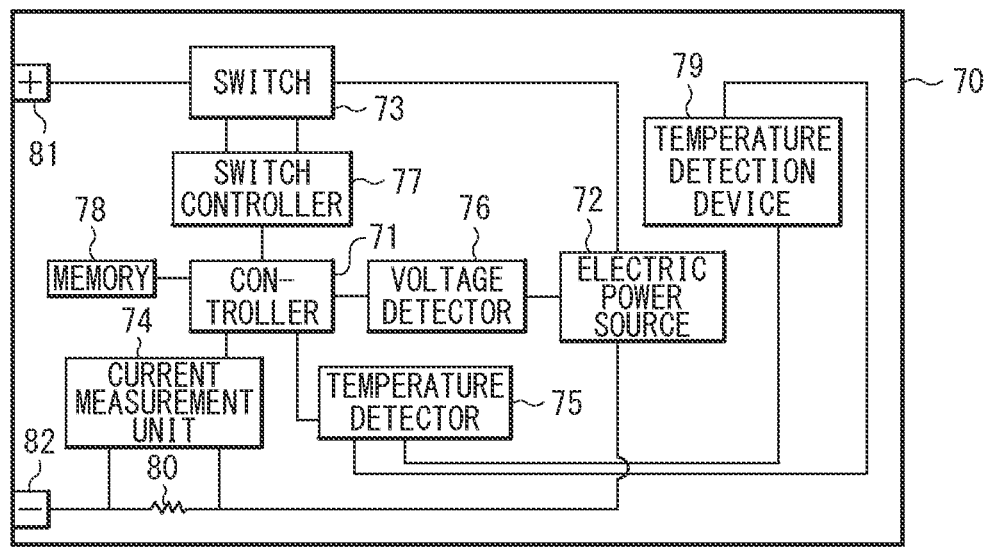
FIG. 6 is a block diagram illustrating a configuration of an application example of the secondary battery, which is a battery pack including an assembled battery.

FIG. 6 illustrates a block configuration of a battery pack including an assembled battery. In the following description, reference will be made as necessary to the components of the battery pack including the single battery (FIG. 5).

As illustrated in FIG. 6, the battery pack includes a positive electrode terminal 81 and a negative electrode terminal 82. Specifically, the battery pack includes, inside a housing 70, the following components: a controller 71, an electric power source 72, a switch 73, a current measurement unit 74, a temperature detector 75, a voltage detector 76, a switch controller 77, a memory 78, a temperature detection device 79, and a current detection resistor 80.

The electric power source 72 includes an assembled battery in which two or more secondary batteries are coupled to each other, and a type of the coupling of the two or more secondary batteries is not particularly limited. Accordingly, the coupling scheme may be in series, in parallel, or of a mixed type of both. For example, the electric power source 72 includes six secondary batteries coupled to each other in two parallel and three series.

Configurations of the controller 71, the switch 73, the temperature detector 75, and the temperature detection device 79 are similar to those of the controller 66, the switch 67, and the temperature detector 69 (the temperature detection device). The current measurement unit 74 measures a current using the current detection resistor 80, and outputs a result of the measurement of the current to the controller 71. The voltage detector 76 measures a battery voltage of the electric power source 72 (the secondary battery) and provides the controller 71 with a result of the measurement of the voltage that has been subjected to analog-to-digital conversion.

The switch controller 77 controls an operation of the switch 73 in response to signals supplied by the current measurement unit 74 and the voltage detector 76. If a battery voltage reaches an overcharge detection voltage or an overdischarge detection voltage, the switch controller 77 turns off the switch 73 (the charge control switch). This prevents a charging current from flowing into a current path of the electric power source 72. This enables the electric power source 72 to perform only discharging via the discharging diode, or only charging via the charging diode. In addition, if a large current flows upon charging or discharging, the switch controller 77 blocks the charging current or the discharging current.

The switch controller 77 may be omitted and the controller 71 may thus also serve as the switch controller 77. The overcharge detection voltage and the overdischarge detection voltage are not particularly limited, and are similar to those described above in relation to the battery pack including the single battery.

The memory 78 includes, for example, an electrically erasable programmable read-only memory (EEPROM) which is a non-volatile memory, and the memory 78 stores, for example, a numeric value calculated by the controller 71 and data (e.g., an initial internal resistance, a full charge capacity, and a remaining capacity) of the secondary battery measured in the manufacturing process.

The positive electrode terminal 81 and the negative electrode terminal 82 are terminals coupled to, for example, external equipment that operates using the battery pack, such as a laptop personal computer, or external equipment that is used to charge the battery pack, such as a charger. The electric power source 72 (the secondary battery) is chargeable and dischargeable via the positive electrode terminal 81 and the negative electrode terminal 82.

Figure 7:
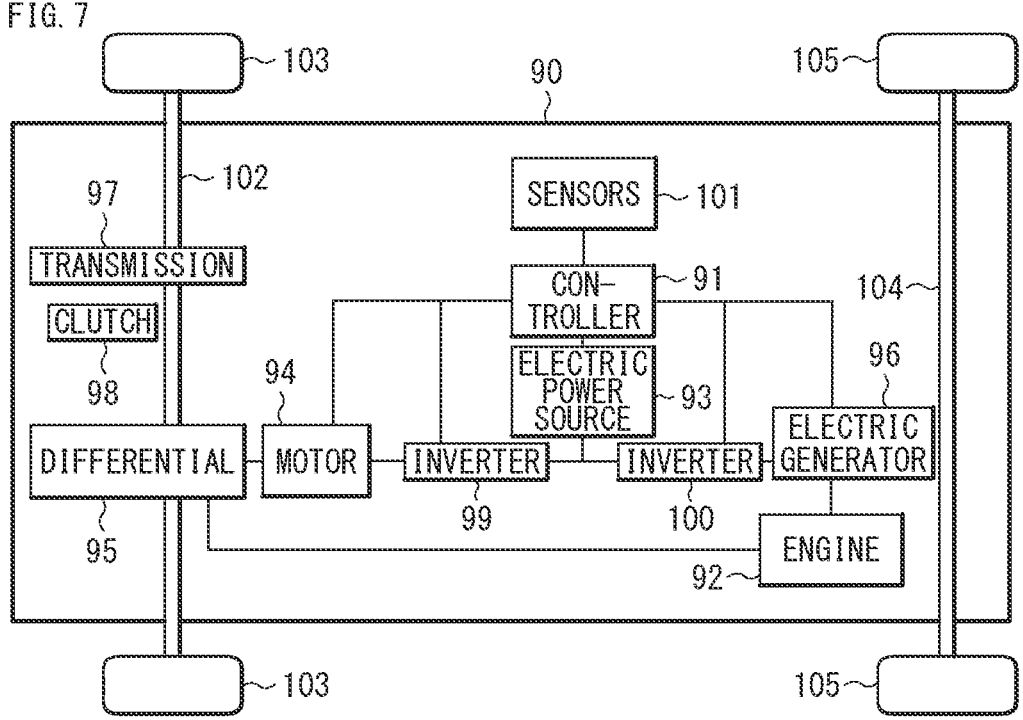
FIG. 7 is a block diagram illustrating a configuration of an application example of the secondary battery, which is an electric vehicle.

FIG. 7 illustrates a block configuration of a hybrid automobile which is an example of the electric vehicle. As illustrated in FIG. 7, the electric vehicle includes, inside a housing 90, the following components: a controller 91, an engine 92, an electric power source 93, a motor 94, a differential 95, an electric generator 96, a transmission 97, a clutch 98, inverters 99 and 100, and sensors 101. The electric vehicle also includes a front wheel drive shaft 102, a pair of front wheels 103, a rear wheel drive shaft 104, and a pair of rear wheels 105. The front wheel drive shaft 102 and the pair of front wheels 103 are coupled to the differential 95 and the transmission 97.

The electric vehicle is configured to travel by using one of the engine 92 or the motor 94 as a driving source. The engine 92 is a major power source, such as a gasoline engine. In a case where the engine 92 is used as a power source, a driving force (a rotational force) of the engine 92 is transmitted to the front wheels 103 and the rear wheels 105 via the differential 95, the transmission 97, and the clutch 98, which are driving parts. Note that the rotational force of the engine 92 is transmitted to the electric generator 96, and the electric generator 96 thus generates alternating-current power by utilizing the rotational force. In addition, the alternating-current power is converted into direct-current power via the inverter 100, and the direct-current power is thus accumulated in the electric power source 93. In contrast, in a case where the motor 94 which is a converter is used as a power source, electric power (direct-current power) supplied from the electric power source 93 is converted into alternating-current power via the inverter 99. Thus, the motor 94 is driven by utilizing the alternating-current power. A driving force (a rotational force) converted from the electric power by the motor 94 is transmitted to the front wheels 103 and the rear wheels 105 via the differential 95, the transmission 97, and the clutch 98, which are the driving parts.

When the electric vehicle is decelerated by means of a brake mechanism, a resistance force at the time of the deceleration is transmitted as a rotational force to the motor 94. Thus, the motor 94 may generate alternating-current power by utilizing the rotational force. The alternating-current power is converted into direct-current power via the inverter 99, and direct-current regenerative power is thus accumulated in the electric power source 93.

The controller 91 includes, for example, a CPU, and controls an overall operation of the electric vehicle. The electric power source 93 includes one or more secondary batteries and is coupled to an external electric power source. In this case, the electric power source 93 may be supplied with electric power from the external electric power source and thereby accumulate the electric power. The sensors 101 are used to control the number of revolutions of the engine 92 and to control an angle of a throttle valve (a throttle angle). The sensors 101 include one or more of sensors including, without limitation, a speed sensor, an acceleration sensor, and an engine speed sensor.

The case where the electric vehicle is a hybrid automobile has been described as an example; however, the electric vehicle may be a vehicle that operates using only the electric power source 93 and the motor 94 and not using the engine 92, such as an electric automobile.

Although not specifically illustrated here, other application examples are also conceivable as application examples of the secondary battery.

Specifically, the secondary battery is applicable to an electric power storage system. The electric power storage system includes, inside a building such as a residential house or a commercial building, the following components: a controller, an electric power source including one or more secondary batteries, a smart meter, and a power hub.

The electric power source is coupled to electric equipment such as a refrigerator installed inside the building, and is couplable to an electric vehicle such as a hybrid automobile stopped outside the building. Further, the electric power source is coupled, via the power hub, to a home power generator such as a solar power generator installed at the building, and is also coupled, via the smart meter and the power hub, to a centralized power system of an external power station such as a thermal power station.

Alternatively, the secondary battery is applicable to an electric power tool such as an electric drill or an electric saw. The electric power tool includes, inside a housing to which a movable part such as a drilling part or a saw blade part is attached, the following components: a controller, and an electric power source including one or more secondary batteries.

EXAMPLES

A description is given of Examples of the present technology below.

Experiment Examples 1-1 to 1-9

Secondary batteries (lithium-ion secondary batteries) of the laminated-film type illustrated in FIGS. 1 and 2 were fabricated, following which the secondary batteries were evaluated for their respective battery characteristics as described below.

[Fabrication of Secondary Battery]

The secondary batteries were fabricated in accordance with the following procedure.

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on opposite sides of the positive electrode current collector 11A (a band-shaped aluminum foil having a thickness of 12 μm) by means of a coating apparatus, following which the applied positive electrode mixture slurry was dried to thereby form the positive electrode active material layers 11B. Lastly, the positive electrode active material layers 11B were compression-molded by means of a roll pressing machine. In this manner, the positive electrode active material layers 11B were formed on respective opposite sides of the positive electrode current collector 11A. Thus, the positive electrode 11 was fabricated.

(Fabrication of Negative Electrode)

First, 93 parts by mass of the negative electrode active material (graphite) and 7 parts by mass of the positive electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on opposite sides of the negative electrode current collector 12A (a band-shaped copper foil having a thickness of 15 μm) by means of a coating apparatus, following which the applied negative electrode mixture slurry was dried to thereby form the negative electrode active material layers 12B. Lastly, the negative electrode active material layers 12B were compression-molded by means of a roll pressing machine. In this manner, the negative electrode active material layers 12B were formed on the respective opposite sides of the negative electrode current collector 12A. Thus, the negative electrode 12 was fabricated.

(Preparation of Electrolytic Solution)

The electrolyte salt (lithium hexafluorophosphate) was added to a solvent, following which the solvent was stirred. Used as the solvent were ethylene carbonate (EC) serving as the carbonic-acid-ester-based compound (the cyclic carbonic acid ester), and the compound represented by Formula (1-1) serving as the branched carboxylic acid ester compound. A composition of the solvent, i.e., a content (wt %) of each component, was as described in Table 1. The content of the electrolyte salt with respect to the solvent was set to 1 mol/kg. In this case, another compound to be described later (propyl propionate serving as the carboxylic-acid-ester-based compound) was also used on an as-needed basis as the solvent.

For comparison, the electrolytic solution was prepared in accordance with a similar procedure except that the other compound was used instead of the branched carboxylic acid ester compound. Used as the other compound was propyl propionate (PrPr) serving as the carboxylic-acid-ester-based compound.

(Assembly of Secondary Battery)

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 15 μm) interposed therebetween, following which the stack of the positive electrode 11, the negative electrode 12, and the separator 13 was wound to thereby fabricate a wound body.

Thereafter, the film 20 was folded in such a manner as to sandwich the wound body placed in the depression part 20U, following which the outer edges of two sides of the film 20 were thermal fusion bonded to each other to thereby allow the wound body to be contained inside the pouch-shaped film 20. As the film 20, an aluminum laminated film was used in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from the inner side.

Lastly, the electrolytic solution was injected into the pouch-shaped film 20 and thereafter, the outer edges of the remaining one side of the film 20 were thermal fusion bonded to each other in a reduced-pressure environment. In this case, the sealing film 21 (a polypropylene film having a thickness of 5 μm) was interposed between the film 20 and the positive electrode lead 14, and the sealing film 22 (a polypropylene film having a thickness of 5 μm) was interposed between the film 20 and the negative electrode lead 15. The wound body was thereby impregnated with the electrolytic solution. Thus, the wound electrode body 10 was formed. In this manner, the wound electrode body 10 was sealed in the film 20. As a result, the secondary battery of the laminated-film type was completed.

Evaluation of the secondary batteries for battery characteristic (a cyclability characteristic) revealed the results described in Table 1.

In a case of examining the cyclability characteristic, first, the secondary battery was charged and discharged for one cycle in an ambient temperature environment (at a temperature of 23° C.), in order to stabilize a state of the secondary battery. Thereafter, the secondary battery was charged and discharged again in the same environment to thereby measure a discharge capacity (a second-cycle discharge capacity). Thereafter, the secondary battery was repeatedly charged and discharged in the same environment until the total number of cycles reached 50 to thereby measure the discharge capacity (a 50th-cycle discharge capacity). Lastly, the following was calculated: capacity retention rate (%)= (50th-cycle discharge capacity/second-cycle discharge capacity)×100.

Upon charging, the secondary battery was charged with a constant current of 0.1 C until the potential of the positive electrode 11, i.e., a positive electrode potential, versus a lithium reference electrode reached a value indicated in Table 1, and was thereafter charged with a constant voltage until a current reached 0.05 C in the positive electrode potential. Upon discharging, the secondary battery was discharged with a constant current of 0.1 C until the voltage reached 3.00 V. Note that 0.1 C is a value of a current that causes a battery capacity (a theoretical capacity) to be completely discharged in 10 hours, and 0.05 C is a value of a current that causes the battery capacity to be completely discharged in 20 hours.

Note that values of the capacity retention rate indicated in Table 1 are each a value normalized by setting a value of the capacity retention rate as 100 in a case (Experiment example 1-5, 1-7, or 1-9) where the content of the cyclic carbonic acid ester (EC) was 30 wt % and the content of the other compound (PrPr) was 70 wt % for each of the positive electrode potentials (4.45 V, 4.50 V, and 4.55 V).

TABLE 1

| Experiment example | Positive electrode potential (V) | Cyclic carbonic acid ester Kind | Cyclic carbonic acid ester Content (wt %) | Branched carboxylic acid ester compound Kind | Branched carboxylic acid ester compound Content (wt %) | Other compound Kind | Other compound Content (wt %) | Capacity retention rate (normalized) |
|---|---|---|---|---|---|---|---|---|
| 1-1 | 4.55 | EC | 50 | Formula (1-1) | 50 | — | — | 110 |
| 1-2 |  |  | 30 | (1-1) | 70 |  |  | 115 |
| 1-3 |  |  | 20 |  | 80 |  |  | 110 |
| 1-4 |  |  | 30 |  | 50 | PrPr | 20 | 113 |
| 1-5 |  |  | 30 | — | — | PrPr | 70 | 100 |
| 1-6 | 4.50 | EC | 30 | Formula (1-1) | 70 | — | — | 109 |
| 1-7 |  | — | — | — | — | PrPr | 70 | 100 |
| 1-8 | 4.45 | EC | 30 | Formula (1-1) | 70 | — | — | 101 |
| 1-9 |  | — | — | — | — | PrPr | 70 | 100 |

As described in Table 1, the cyclability characteristic of the secondary battery varied greatly depending on a value of the positive electrode potential (an upper limit of a charge voltage) and a composition of the electrolytic solution.

Specifically, in a case where the secondary battery was charged until the positive electrode potential became lower than 4.50 V (Experiment examples 1-8 and 1-9), the capacity retention rate hardly varied depending on whether the electrolytic solution included the branched carboxylic acid ester compound. In other words, the capacity retention rate obtained in a case where the branched carboxylic acid ester compound was used (Experiment example 1-8) was approximately equal to the capacity retention rate obtained in a case where the other compound was used (Experiment example 1-9).

In contrast, in a case where the secondary battery was charged until the positive electrode potential became higher than or equal to 4.50 V (Experiment examples 1-1 to 1-7), the capacity retention rate varied greatly depending on whether the electrolytic solution included the branched carboxylic acid ester compound.

Specifically, in the case where the branched carboxylic acid ester compound was used (Experiment examples 1-1 to 1-4 and 1-6), the capacity retention rate greatly increased as compared with the case where the other compound was used (1-5 and 1-7).

In particular, in the case where the electrolytic solution included the branched carboxylic acid ester compound, a sufficient capacity retention rate was obtained if the content of the branched carboxylic acid ester compound in the solvent was within a range from 50 wt % to 80 wt % both inclusive and the content of the cyclic carbonic acid ester in the solvent was within a range from 20 wt % to 50 wt % both inclusive (Experiment examples 1-1 to 1-3). Further, if the electrolytic solution included the branched carboxylic acid ester compound, a sufficient capacity retention rate was obtained even if the electrolytic solution further included the other compound (the carboxylic-acid-ester-based compound) (Experiment example 1-4).

Experiment Examples 2-1 to 2-3

As described in Table 2, secondary batteries were fabricated and were evaluated for their respective battery characteristics by similar procedures except that the composition of the electrolytic solution was changed. In this case, the electrolytic solution was prepared by the above-described procedure, following which a cyclic disulfonic acid anhydride (1,3-propanedisulfonic acid anhydride (PSAH)) was added to the electrolytic solution. A content (wt %) of the cyclic disulfonic acid anhydride in the electrolytic solution was as indicated in Table 2.

TABLE 2

| Experiment example | Positive electrode potential (V) | Cyclic carbonic acid ester Kind | Cyclic carbonic acid ester Content (wt %) | Branched carboxylic acid ester compound Kind | Branched carboxylic acid ester compound Content (wt %) | Cyclic disulfonic acid anhydride Kind | Cyclic disulfonic acid anhydride Content (wt %) | Capacity retention rate (normalized) |
|---|---|---|---|---|---|---|---|---|
| 1-2 | 4.55 | EC | 30 | Formula (1-1) | 70 | — | — | 115 |
| 2-1 |  |  |  |  |  | PSAH | 0.01 | 118 |
| 2-2 |  |  |  |  |  |  | 0.5 | 119 |
| 2-3 |  |  |  |  |  |  | 1 | 121 |

As described in Table 2, in a case where the electrolytic solution included the cyclic disulfonic acid anhydride (Experiment examples 2-1 to 2-3), the capacity retention rate further increased as compared with a case where the electrolytic solution included no cyclic disulfonic acid anhydride (Experiment example 1-2). In this case, a sufficient capacity retention rate was obtained if the content of the cyclic disulfonic acid anhydride in the electrolytic solution was within a range from 0.01 wt % to 1 wt % both inclusive.

Based upon the results described in Tables 1 and 2, in the case where the electrolytic solution included the branched carboxylic acid ester compound in the secondary battery which was charged until the positive electrode potential versus a lithium reference electrode became higher than or equal to 4.50 V, the cyclability characteristic improved. Accordingly, a superior battery characteristic of the secondary battery was obtained.

Although the technology has been described above with reference to the embodiments and Examples, configurations of the technology are not limited to those described with reference to the embodiments and Examples above and are modifiable in a variety of ways.

Specifically, although the description has been given of the case of using the liquid electrolyte (the electrolytic solution) and the case of using the gel electrolyte (the electrolyte layer), the electrolyte is not particularly limited in kind. Thus, an electrolyte in a solid form (a solid electrolyte) may be used.

Further, although the description has been given of the case where the secondary battery has a battery structure of the laminated-film type, the battery structure is not particularly limited. Accordingly, the battery structure of the secondary battery may be of any other type, such as the cylindrical type, a prismatic type, or a coin type.

Further, although the description has been given of the case where the battery device has a device structure of the wound type and the case where the battery device has a device structure of the stacked type, the device structure of the battery device is not particularly limited. Accordingly, the device structure of the battery device may be of any other type, such as a zigzag folded type in which the electrodes (the positive electrode and the negative electrode) are each folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the technology are therefore not limited to those described herein. Accordingly, the technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a positive electrode having a potential, versus a lithium reference electrode, at a time of charging higher than or equal to 4.50 volts;
a negative electrode; and
an electrolytic solution including a branched carboxylic acid ester compound represented by Formula (1),

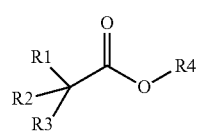

where
R1 is a first alkyl group,
R2 is a second alkyl group,
R3 is a hydrogen group,
R4 is one of a third alkyl group or a halogenated alkyl group, and
a total of a carbon number of R1, a carbon number of R2, and a carbon number of R3 is 2 or 3.
2. The secondary battery according to claim 1, wherein a carbon number of R4 is greater than or equal to 1 and less than or equal to 5.

3. The secondary battery according to claim 1, wherein
the electrolytic solution includes a solvent,
the solvent includes the branched carboxylic acid ester compound, and
a content of the branched carboxylic acid ester compound in the solvent is greater than or equal to 50 weight percent and less than or equal to 80 weight percent.

4. The secondary battery according to claim 1, wherein
the electrolytic solution includes a solvent,
the solvent includes a cyclic carbonic acid ester, and
a content of the cyclic carbonic acid ester in the solvent is greater than or equal to 20 weight percent and less than or equal to 50 weight percent.

5. The secondary battery according to claim 1, wherein
the electrolytic solution further includes a cyclic disulfonic acid anhydride, and
a content of the cyclic disulfonic acid anhydride in the electrolytic solution is greater than or equal to 0.01 weight percent and less than or equal to 1 weight percent.

6. The secondary battery according to claim 1, wherein the secondary battery comprises a lithium-ion secondary battery.

7. The secondary battery according to claim 1, wherein R4 is the third alkyl group.

8. The secondary battery according to claim 7, wherein the third alkyl group is one of $CH_3$, $C_2H_5$, $C_3H_7$, and $C_5H_{10}$.

9. The secondary battery according to claim 8, wherein R1 is $CH_3$ and R2 is $CH_3$ or $C_2H_5$.

\* \* \* \* \*